United States Patent
Baker et al.

(10) Patent No.: US 9,118,380 B2
(45) Date of Patent: *Aug. 25, 2015

(54) REPEATER WITH POSITIONING CAPABILITIES

(75) Inventors: Kenneth R. Baker, Boulder, CO (US); Charles E. Wheatley, III, Del Mar, CA (US); Daniel J. Willis, Lafayette, CO (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2090 days.

This patent is subject to a terminal disclaimer.

(21) Appl. No.: 11/547,698

(22) PCT Filed: Apr. 30, 2004

(86) PCT No.: PCT/US2004/013203
§ 371 (c)(1),
(2), (4) Date: Oct. 31, 2008

(87) PCT Pub. No.: WO2005/103753
PCT Pub. Date: Nov. 3, 2005

(65) Prior Publication Data
US 2009/0053993 A1      Feb. 26, 2009

Related U.S. Application Data

(60) Provisional application No. 60/559,546, filed on Apr. 5, 2004.

(51) Int. Cl.
*H04B 7/15* (2006.01)
*H04B 7/155* (2006.01)
*G01S 19/06* (2010.01)
*H04B 7/185* (2006.01)
(Continued)

(52) U.S. Cl.
CPC .............. *H04B 7/155* (2013.01); *G01S 5/0273* (2013.01); *G01S 19/06* (2013.01); *H04B 7/18554* (2013.01)

(58) Field of Classification Search
USPC .............................................. 455/11.1, 456.1
See application file for complete search history.

(56) References Cited

U.S. PATENT DOCUMENTS 3,670,249 A   6/1972   Meslener
4,723,320 A   2/1988   Horton
(Continued)

FOREIGN PATENT DOCUMENTS

EP   0588598 A1   3/1994
EP   0651360      3/1995
(Continued)

OTHER PUBLICATIONS

International Search Report—International Search Authority—PCT/US04/13202—Nov. 3, 2005.
(Continued)

*Primary Examiner* — Ayodeji Ayotunde
(74) *Attorney, Agent, or Firm* — Thien T. Nguyen

(57) ABSTRACT

This disclosure is directed to a repeater (14) of a wireless communication system (6) that includes a positioning unit (4), such as a GPS receiver, in order to calculate the location of the repeater (14). In addition, various techniques are described that exploit the positioning information generated by the repeater (14) in order to improve the wireless communication system (6).

28 Claims, 5 Drawing Sheets

(51) Int. Cl.
*G01S 5/02* (2010.01)
*H04W 24/00* (2009.01)

(56) References Cited

U.S. PATENT DOCUMENTS

| | | | |
|---|---|---|---|
| 4,901,307 A | 2/1990 | Gilhousen et al. | |
| 4,993,021 A | 2/1991 | Nannicini et al. | |
| 5,056,109 A | 10/1991 | Gilhousen et al. | |
| 5,103,459 A | 4/1992 | Gilhousen et al. | |
| 5,210,632 A | 5/1993 | Murakami et al. | |
| 5,355,511 A | 10/1994 | Hatano et al. | |
| 5,383,219 A | 1/1995 | Wheatley, III et al. | |
| 5,396,516 A | 3/1995 | Padovani et al. | |
| 5,416,468 A * | 5/1995 | Baumann | 340/573.1 |
| 5,440,418 A | 8/1995 | Ishimura et al. | |
| 5,507,452 A | 4/1996 | Mayersak | |
| 5,608,393 A | 3/1997 | Hartman | |
| 5,626,630 A | 5/1997 | Markowitz et al. | |
| 5,646,630 A | 7/1997 | Sheynblat et al. | |
| 5,812,933 A | 9/1998 | Niki | |
| 5,815,795 A | 9/1998 | Iwai | |
| 5,910,943 A | 6/1999 | Wickman | |
| 5,991,345 A | 11/1999 | Ramasastry | |
| 6,049,535 A | 4/2000 | Ozukturk et al. | |
| 6,052,558 A | 4/2000 | Cook et al. | |
| 6,108,364 A | 8/2000 | Weaver, Jr. et al. | |
| 6,118,809 A | 9/2000 | Lo | |
| 6,147,981 A | 11/2000 | Prescott | |
| 6,185,429 B1 | 2/2001 | Gehrke et al. | |
| 6,188,719 B1 | 2/2001 | Collomby | |
| 6,266,008 B1 | 7/2001 | Huston et al. | |
| 6,272,316 B1 | 8/2001 | Wiedeman et al. | |
| 6,307,504 B1 | 10/2001 | Sheynblat | |
| 6,317,420 B1 | 11/2001 | Schiff | |
| 6,346,911 B1 | 2/2002 | King | |
| 6,347,216 B1 | 2/2002 | Marko et al. | |
| 6,349,211 B2 | 2/2002 | Koshima et al. | |
| 6,377,792 B1 | 4/2002 | Brown et al. | |
| 6,404,775 B1 | 6/2002 | Leslie et al. | |
| 6,415,155 B1 | 7/2002 | Koshima et al. | |
| 6,429,808 B1 | 8/2002 | King et al. | |
| 6,430,415 B1 | 8/2002 | Agashe et al. | |
| 6,501,955 B1 | 12/2002 | Durrant et al. | |
| 6,507,741 B1 | 1/2003 | Bassirat | |
| 6,515,975 B1 | 2/2003 | Chheda et al. | |
| 6,615,021 B1 | 9/2003 | Lovinggood et al. | |
| 6,690,657 B1 | 2/2004 | Lau et al. | |
| 6,757,263 B1 | 6/2004 | Olds | |
| 6,788,663 B2 | 9/2004 | Rowitch | |
| 6,889,033 B2 | 5/2005 | Bongfeldt | |
| 6,901,264 B2 | 5/2005 | Myr | |
| 6,901,268 B2 | 5/2005 | Chang | |
| 6,999,778 B2 | 2/2006 | DiBuduo | |
| 7,013,111 B2 | 3/2006 | Kuwahara et al. | |
| 7,020,436 B2 | 3/2006 | Schmutz | |
| 7,027,773 B1 | 4/2006 | McMillin | |
| 7,039,418 B2 | 5/2006 | Amerga et al. | |
| 7,058,400 B2 | 6/2006 | Brooks | |
| 7,062,224 B2 | 6/2006 | Baker et al. | |
| 7,068,973 B1 | 6/2006 | Lovinggood et al. | |
| 7,075,481 B2 | 7/2006 | Huston et al. | |
| 7,123,911 B1 | 10/2006 | Ngan | |
| 7,139,580 B2 | 11/2006 | Stein et al. | |
| 7,218,275 B2 | 5/2007 | Han | |
| 7,355,993 B2 | 4/2008 | Adkins et al. | |
| 7,457,584 B2 * | 11/2008 | Baker et al. | 455/11.1 |
| 7,526,247 B2 | 4/2009 | Baker et al. | |
| 7,590,383 B2 | 9/2009 | Dean et al. | |
| 7,778,596 B2 | 8/2010 | Anderson et al. | |
| 7,831,263 B2 | 11/2010 | Sheynblat et al. | |
| 8,320,825 B2 | 11/2012 | Goeransson et al. | |
| 8,514,764 B2 | 8/2013 | Baker et al. | |
| 8,665,774 B2 | 3/2014 | Dean | |
| 2001/0031624 A1 | 10/2001 | Schmutz | |
| 2001/0036833 A1 | 11/2001 | Koshima et al. | |
| 2001/0046878 A1 | 11/2001 | Chang | |
| 2002/0028655 A1 | 3/2002 | Rosener et al. | |
| 2002/0045431 A1 | 4/2002 | Bongfeldt | |
| 2002/0070891 A1 | 6/2002 | Huston et al. | |
| 2002/0115448 A1 * | 8/2002 | Amerga et al. | 455/456 |
| 2002/0160813 A1 | 10/2002 | Miya | |
| 2002/0167918 A1 | 11/2002 | Brewer | |
| 2002/0183069 A1 | 12/2002 | Myr | |
| 2003/0008663 A1 * | 1/2003 | Stein et al. | 455/456 |
| 2003/0008669 A1 | 1/2003 | Stein et al. | |
| 2003/0023682 A1 | 1/2003 | Brown et al. | |
| 2003/0039267 A1 | 2/2003 | Koo et al. | |
| 2003/0076979 A1 | 4/2003 | Matsui | |
| 2003/0083008 A1 | 5/2003 | Baker et al. | |
| 2003/0086401 A1 | 5/2003 | Lee et al. | |
| 2003/0123401 A1 | 7/2003 | Dean | |
| 2003/0125045 A1 * | 7/2003 | Riley et al. | 455/456 |
| 2003/0151506 A1 * | 8/2003 | Luccketti | 340/539.13 |
| 2003/0162550 A1 | 8/2003 | Kuwahara et al. | |
| 2003/0193992 A1 | 10/2003 | Challa et al. | |
| 2003/0220075 A1 | 11/2003 | Baker et al. | |
| 2004/0001464 A1 | 1/2004 | Adkins et al. | |
| 2004/0006696 A1 | 1/2004 | Shin et al. | |
| 2004/0012086 A1 | 1/2004 | Infantolino et al. | |
| 2004/0028003 A1 | 2/2004 | Diener et al. | |
| 2004/0073916 A1 | 4/2004 | Petrovic et al. | |
| 2004/0095733 A1 | 5/2004 | Cheng et al. | |
| 2004/0097190 A1 | 5/2004 | Durrant et al. | |
| 2004/0162086 A1 * | 8/2004 | Han | 455/456.1 |
| 2004/0176026 A1 | 9/2004 | Gainey et al. | |
| 2004/0203864 A1 * | 10/2004 | DiBuduo | 455/456.1 |
| 2004/0212518 A1 * | 10/2004 | Tajima et al. | 340/928 |
| 2006/0046642 A1 | 3/2006 | Bassiri et al. | |
| 2007/0052560 A1 | 3/2007 | Van Der Veen et al. | |

FOREIGN PATENT DOCUMENTS

| | | |
|---|---|---|
| EP | 0822674 A1 | 2/1998 |
| EP | 0840533 A2 | 5/1998 |
| EP | 0851695 A2 | 7/1998 |
| EP | 0924878 A2 | 6/1999 |
| EP | 0935356 A2 | 8/1999 |
| EP | 1093273 A1 | 4/2001 |
| EP | 1207404 | 5/2002 |
| GB | 2378614 A | 2/2003 |
| JP | 04-095791 | 3/1992 |
| JP | 2000055492 A | 2/2000 |
| JP | 2000505251 T | 4/2000 |
| JP | 2001128208 A | 5/2001 |
| JP | 2001209891 | 8/2001 |
| JP | 2006-512874 | 4/2006 |
| KR | 20030082363 A | 10/2003 |
| KR | 20030088511 | 11/2003 |
| WO | WO9613103 A1 | 5/1996 |
| WO | 9706648 | 2/1997 |
| WO | 9732445 | 9/1997 |
| WO | 9927747 | 6/1999 |
| WO | WO0064091 A2 | 10/2000 |
| WO | 0133302 | 5/2001 |
| WO | WO0150635 | 7/2001 |
| WO | 0199444 | 12/2001 |
| WO | 0217669 | 2/2002 |
| WO | WO0233996 A1 | 4/2002 |
| WO | 02059638 | 8/2002 |
| WO | 02087275 | 10/2002 |
| WO | WO03036824 A1 | 5/2003 |
| WO | WO03044970 A2 | 5/2003 |
| WO | WO03061202 A1 | 7/2003 |
| WO | WO03093859 A1 | 11/2003 |
| WO | WO2004095733 | 11/2004 |

OTHER PUBLICATIONS

International Search Report—International Search Authority—PCT/US04/13203—Nov. 3, 2005.
International Search Report—International Search Authority—PCT/US03/36083—Apr. 14, 2004.
Written Opinion—PCT/US04/013203, ISA/US, Alexandria, VA Sep. 29, 2004.

(56) References Cited

OTHER PUBLICATIONS

International Preliminary Report on Patentability—PCT/US04/013203, IPEA/US, Alexandria, VA Dec. 8, 2005.

Bavafa, et al., Repeaters for CDMA Systems, 48th IEEE Vehicular Technology Conference, 1998, VTC 98, May 18-21, 1998; vol. 2, pp. 1161-1165.

European Search Report—EP07003152, Search Authority—Munich Patent Office—Oct. 11, 2007.

International Preliminary Examination Report—PCT/US02/034332, IPEA/US, Jul. 28, 2004.

International Preliminary Examination Report—PCT/US02/037408, IPEA-US, Oct. 17, 2006.

International Preliminary Examination Repor—PCT/US03/036083, IPEA/US, Apr. 29, 2005.

International Preliminary Examination Report—PCT/US03/038803, IPEA-US, Jul. 28, 2004.

International Preliminary Examination Report—PCT/US04/013202, IPEA/US, Alexandria, VA Feb. 3, 2006.

International Preliminary Report on Patentability—PCT/US03/000495, IPEA/US, Jan. 17, 2006.

International Preliminary Report on Patentability—PCT/US06/001286, International Bureau of WIPO—Geneva, Switzerland, Jul. 17, 2007.

International Preliminary Report on Patentability, PCT/US2005/020091, The International Bureau of WIPO, Geneva, Switzerland, Jan. 30, 2007.

International Search Report—PCT/US02/034332, International Search Authority—European Patent Office, Mar. 6, 2003.

International Search Report—PCT/US03/000495, International Search Authority—European Patent Office, May 30, 2003.

International Search Report—PCT/US03/038803, International Search Authority—US, Apr. 9, 2004.

International Search Report—PCT/US04/013202, ISA/US, Alexandria, VA Oct. 12, 2004.

International Search Report—PCT/US04/013203, International Search Authority/US, Alexandria, VA Sep. 29, 2004.

International Search Report—PCT/US06/001286, International Search Authority—European Patent Office, May 31, 2006.

International Search Report, PCT/US02/037408, International Search Authority, European Patent Office, Dec. 30, 2004.

International Search Report, PCT/US2005/020091, International Searching Authority,European Patent Office, Jul. 9, 2005.

Simon, et al., "Spread Spectrum Communications Handbook," Revised Edition, McGraw-Hill, 1994, ISBN 0-07-057629-7, pp. 11-12.

Supplementary European Search Report—EP04750874, Munich Patent Office, Nov. 11, 2009.

TIA/EIA/IS-95 Mobile Station-Base Station Compatibility Standard for Dual-Mode Wideband Spread Spectrum Cellular System, Jul. 1993, Sections 6-25-6-26.

TIA/EIA/IS-98-A; "Recommended Minimum Performance Standards for Dual-Mode Wideband Spread Spectrum Cellular Mobile Stations," Telecommunications Industry Association, Jul. 1996.

Written Opinion—PCT/US02/034332, IPEA/US, Aug. 20, 2003.

Written Opinion—PCT/US03/000495, IPEA/US, Oct. 28, 2005.

Written Opinion—PCT/US03/036083, IPEA/US, Jul. 16, 2004.

Written Opinion—PCT/US04/013202, ISA/US, Alexandria, VA Oct. 12, 2004.

Written Opinion—PCT/US06/001286, International Search Authority—European Patent Office, May 31, 2006.

Written Opinion, PCT/US2005/020091, International Searching Authority, European Patent Office, Jul. 9, 2005.

Translation of Office Action application in Japanese application 2005-507153, corresponding to U.S. Appl. No. 10/703,131, citing JP2001-209891 and WO01033302. Dated May 24, 2009.

Translation of Office Action in Korean application 2007-7004427, corresponding to U.S. Appl. No. 10/903,808, citing KR2003-82363. Dated Jun. 19, 2008.

Translation of Office Action in Korean application 2007-7018227, corresponding to U.S. Appl. No. 11/033,597, citing KR2003-0088511. Dated Mar. 25, 2009.

* cited by examiner

REPEATER WITH POSITIONING CAPABILITIES

RELATED APPLICATIONS

This application claims priority to U.S. Provisional Application No. 60/559,546, filed on Apr. 5, 2004.

TECHNICAL FIELD

The disclosure relates to wireless communication and, more particularly, repeaters implemented in wireless communication systems.

BACKGROUND

The Global Positioning System (GPS) is a satellite navigation system designed to provide position information almost anywhere in the world. GPS was developed by the Unites States Department of Defense, and currently includes a constellation of twenty-four operational satellites. Other types of satellite positioning systems include the Wide Area Augmentation System (WAAS), the Global Navigation Satellite System (GLONASS) deployed by the Russian Federation, and the Galileo system planned by the European Union.

A variety of receivers have been designed to decode the signals transmitted from the positioning satellites for the purposes of determining the position of the respective receiver on or near the earth's surface. In order to decipher the signals and compute a position, the receiver acquires signals from the specific satellites that are within view to the receiver, and then measures and tracks the received signals and recovers navigational data from the signals. By accurately measuring the distance from three different satellites, the receiver can triangulate its position, e.g., solving for a latitude, longitude and altitude. The receiver measures its distance to the different satellites by measuring the time it takes each signal to travel from the respective satellite to the receiver. Often, measurements from a fourth satellite are used to help resolve time measurement errors, e.g., errors created by inaccuracies of timing circuits within the receiver. In some cases, signals from fewer than three satellites can be used in combination with terrestrial signals to triangulate the position of the receiver, particularly when visibility to additional satellites is limited.

GPS receivers have been implemented in subscriber units of wireless communication systems in order to allow the users of the subscriber units to exploit GPS. A subscriber unit generally refers to a mobile wireless device used by an end user, such as a mobile radiotelephone, or the like.

In order to accelerate the time it takes the GPS receiver in a subscriber unit of a wireless communication system to identify satellites that are in view to the receiver, GPS assistance techniques have been developed. In particular, signals detected by the subscriber unit within the wireless communication system can be used to generate a rough estimate of the location of the subscriber unit very quickly. Then, GPS assistance information can be sent to the subscriber unit in order to allow the subscriber unit to more quickly identify the satellites that are within view to its GPS receiver.

GPS assistance techniques can greatly accelerate the time it takes a subscriber unit to identify its location using GPS. This is particularly important when the position identification is used to help first responder services, such as the "911" first responder service, to quickly pinpoint the location of the subscriber unit so that help can be dispatched to that location. GPS assistance techniques can also improve the ability of a receiver to compute its position in certain locations where GPS positioning techniques might fail without the assistance, such as the interior of buildings or urban street canyons.

SUMMARY

In one embodiment, this disclosure describes a repeater of a wireless communication system comprising repeating circuitry to receive a signal sent from a first device in the wireless communication system and repeat the signal to a second device in the wireless communication system, and a positioning unit to receive positioning signals and calculate a position of the repeater based on the positioning signals.

Various techniques for using the calculated position of the repeater are also described. For example, techniques for generating position assistance information for a subscriber unit using the calculated position of the repeater are described. Also, techniques for calculating a repeater delay using the calculated position of the repeater are described.

The details of one or more embodiments of this disclosure are set forth in the accompanying drawings and the description below. Other features, objects, and advantages of this disclosure will be apparent from the description and drawings, and from the claims.

DETAILED DESCRIPTION

In general, this disclosure is directed to a repeater of a wireless communication system that includes a positioning unit, such as a GPS receiver, so that the repeater can calculate its location. In addition, various techniques are described that exploit the positioning information generated by the repeater in order to improve the wireless communication system. For example, the positioning information generated by the repeater may be used by a device of the wireless communication system to help calculate a repeater delay. Also, the positioning information generated by the repeater may be used by a position determination entity (PDE) to improve the quality of position assistance information generated and sent to subscriber units of the wireless communication system.

Figure 1:
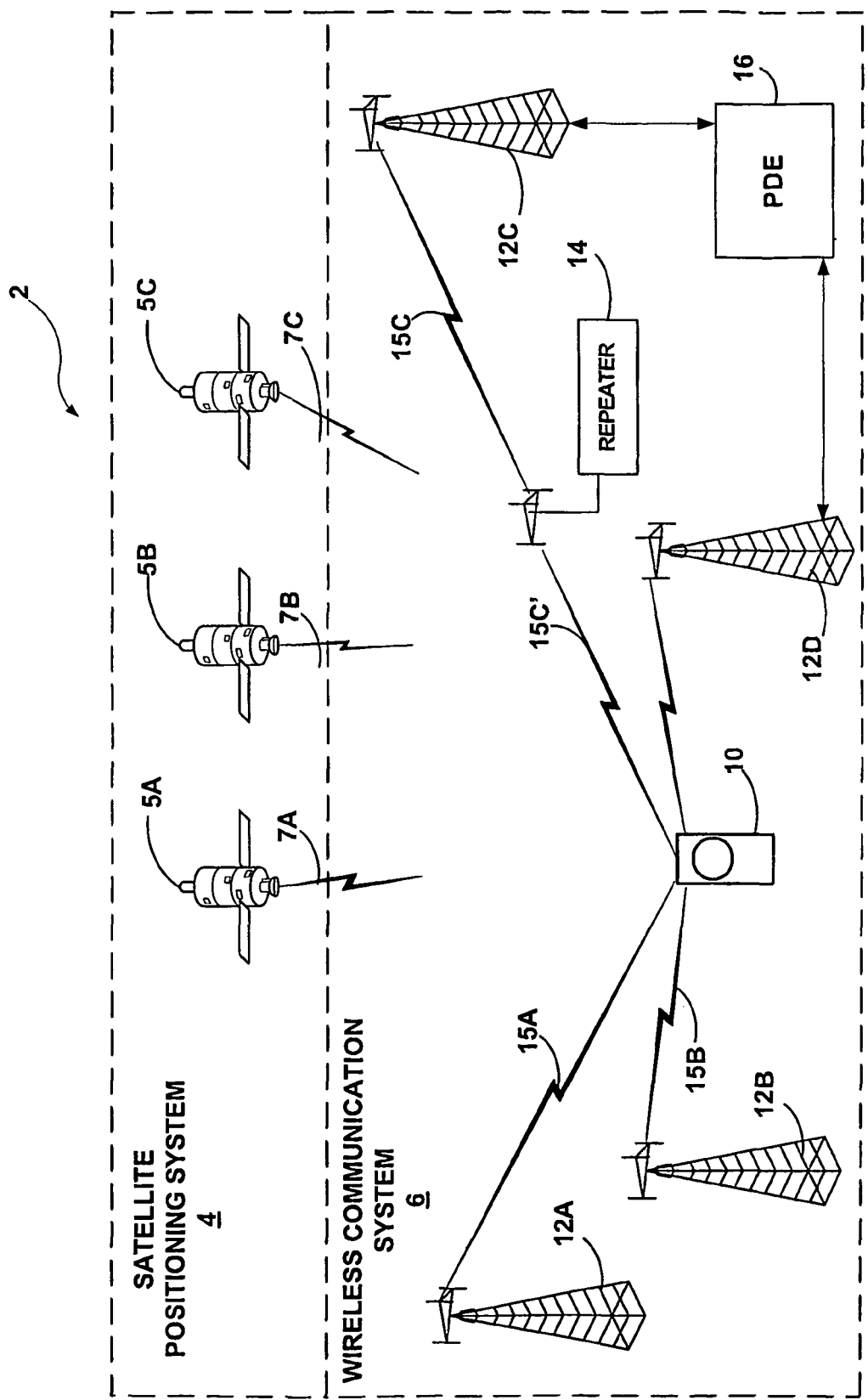
FIG. 1 is a block diagram illustrating an exemplary system according to this disclosure that includes a satellite positioning system and a wireless communication system.

FIG. 1 is a block diagram illustrating an exemplary system 2 comprising a satellite positioning system 4 and a wireless communication system 6. By way of example, satellite positioning system 4 may comprise the global positioning system (GPS) developed by the Unites States Department of Defense. Alternatively, satellite positioning system 4 may comprise the Wide Area Augmentation System (WAAS), the Global Navigation Satellite System (GLONASS) deployed by the Russian Federation, the Galileo system planned by the European Union, or the like. In any case, satellite positioning system 4 includes a plurality of satellites 5A-5C (collectively satellites 5) that orbit the earth and send signals which are received by positioning receivers on or near the earth's surface. Although three satellites 5 are illustrated in FIG. 1 for simplicity, the GPS currently includes twenty-four operational satellites.

Satellites 5 send positioning signals 7A-7C (collectively positioning signals 7), which can be used by subscriber unit 10 of wireless communication system 6 to triangulate its position on or near the earth's surface. In accordance with this disclosure, repeater 14 also includes a positioning unit, such as a GPS receiver, so that repeater 14 can triangulate its position on or near the earth's surface. Repeater 14 generally refers to a network device that receives signals from one or more base stations 12, and retransmits substantially the same signals to one or more subscriber units 10. Repeaters 14 are typically used to extend the range of one or more base stations 12. As described in greater detail below, a number of advantages can be achieved by incorporating positioning capabilities into repeater 14. Various techniques for exploiting the positioning information generated by repeater 14 are also described.

Wireless communication system 6 may be based on any of a wide variety of signal encoding and modulation schemes. For example, wireless communication system 6 may comprise a spread spectrum system such as a code division multiple access (CDMA) system. Alternatively, system 6 may comprise a time division multiple access (TDMA) system, a frequency division multiple access (FDMA) system, a system using orthogonal frequency division multiplexing (OFDM), or the like. Also, system 6 may implement various combinations of CDMA, FDMA, TDMA, and OFDM. For example, the global system for mobile communication (GSM) makes use of FDMA and TDMA techniques.

In wireless communication system 6, base stations 12C-12D (collectively base stations 12) provide network access to subscriber units 10. Although a single subscriber unit 10 is illustrated in FIG. 1, system 6 typically supports a large number of such units. A subscriber unit 10 generally refers to a mobile wireless device used by an end user, such as a mobile radiotelephone, a desktop or portable computer, a personal digital assistant (PDA), an interactive television, a wireless data terminal, a wireless data collection device, or any other wireless device. Base stations 12 are generally stationary equipment that wirelessly communicate with subscriber unit 10 to provide subscriber unit 10 with access to a wired telecommunication network. For example, base stations 12 may provide an interface between the subscriber units and a public switched telephone network (PSTN) such that telephone calls can be routed to and from subscriber unit 10. Alternatively or additionally, base stations 12 may be coupled to a packet-based network for transmission of packet-based voice information or packet-based data.

Wireless communication system 6 also includes one or more repeaters 14. Repeater 14 is typically installed in wireless communication system 6 in order to extend network coverage associated with one or more of the base stations, e.g., base station 12C. Again, repeater 14 generally refers to a network device that receives signals from one or more base stations 12, and retransmits substantially the same signals to one or more subscriber units 10. For example, repeater 14 may receive signals 15C from base station 12C, and repeat signals 15C (the repeated signal being labeled 15C') in order to extend network coverage of base station 12C. In some cases, repeater 14 may be wired to base station 12C, e.g., via a fiber optic link, copper wire, or the like. In other cases, repeater 14 is completely wireless, as illustrated in FIG. 1. Wireless repeaters typically receive a signal, amplify the signal, and then retransmit the amplified signal to the subscriber units (or the base station).

Repeaters are commonly considered a cost-effective mechanism for extending or improving network coverage. In particular, the use of repeaters can effectively broaden the geographical coverage area associated with a given base station. Moreover, the cost of implementing a repeater can be significantly less than the cost of adding an additional base station. Implementing repeaters in a wireless communication system, however, raises a number of challenges and potential difficulties. For example, repeaters can complicate the topology of network 6 and cause a reduction in the accuracy of conventional position assistance information that is sent to subscriber unit 10. For this reason and other reasons, it is desirable to improve techniques of generating position assistance information in wireless communication system 6. One way of improving the generation position assistance information, as described herein, is to exploit position information calculated by repeater 14. In particular, given a knowledge of the location of a repeater, the accuracy and quality of position assistance information can be improved. Unlike subscriber units 10, repeater 14 is generally stationary within wireless communication system 6. Nevertheless, incorporating a positioning unit into repeater 14 can be highly advantageous, as outlined herein.

Positioning assistance techniques generally accelerate the time it takes subscriber unit 10 to identify its location using satellite positioning system 4. Again, this is particularly important when the position identification is used to help first responder services, such as the "911" first responder service. In order to generate position assistance information, system 6 includes one or more position determination entities (PDE) 16, e.g., typically coupled to one or more base stations 12. PDE 16 refers to network equipment that receives input sent from subscriber unit 10 and uses that input to generate position assistance information that is returned to subscriber unit 10. PDE 16 generally maintains a record of the topology of wireless communication system 6 as well as a record of the locations of various satellites 5 of satellite positioning system 4. PDE 16 receives signals from subscriber unit 10, e.g., via base station 12C or 12D, and processes the signals to generate position assistance information. PDE 16 then sends the position assistance information back to subscriber unit 10, e.g., via base station 12D or via base station 12C and repeater 14.

In accordance with this disclosure, PDE 16 also receives position information from repeater 14, e.g., via base station 12C. Accordingly, the records of the topology of wireless communication system 6, maintained by PDE 16, can be updated to reflect that presence of repeater 14 in system 6, and the specific location of repeater 14 within system 6. PDE 16 can use the location of repeater 14 when generating position assistance information. For example, if subscriber unit 10 reports detection of signals associated with base station 12C, PDE 16 may nevertheless determine that subscriber unit 10 is not in close proximity to base station 12C, but rather in proximity to repeater 14. In this manner, the position information determined and sent from repeater 14 to PDE 16 can improve the quality and accuracy of position assistance information generated by PDE 16.

The position information generated by repeater 14 may also be used by other receiving devices of system 6, such as base station 12C or PDE 16. For example, PDE 16 or another device may use the position information determined by repeater 14 in calculating a delay through repeater 14. In particular, PDE 16 may receive positioning information indicative of the locations of repeater 14, subscriber unit 10 and base station 12C. PDE 16 can use this positioning information to calculate a repeater delay for signals sent from subscriber unit 10 to base station 12C through repeater 14. In particular, PDE 16 can calculate the repeater delay based on the positioning information associated with repeater 14, the positioning information associated with subscriber unit 10, the positioning information associated with base station 12C, and signals observed at subscriber unit 10. Additional details of the calculation of repeater delays, in accordance with this disclosure, are discussed below. In general, any device in the network may be used to calculate the repeater delay. In the example illustrated below with reference to FIG. 5, PDE 16B is used to calculate the repeater delay.

Figure 2:
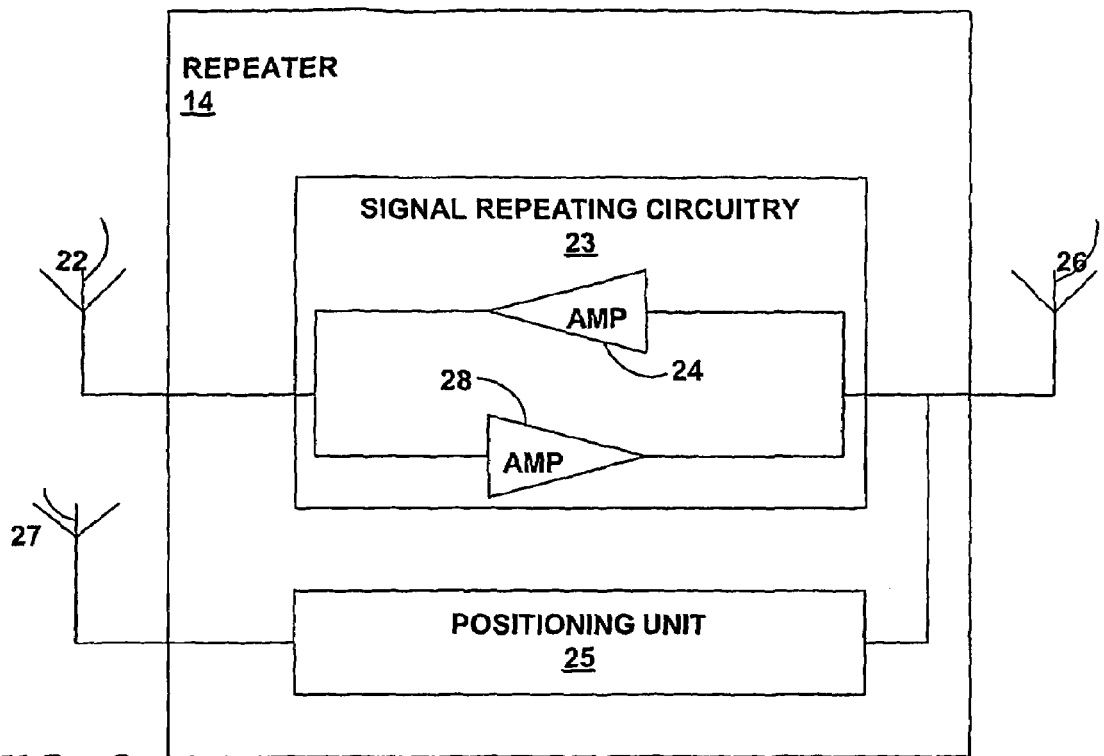
FIG. 2 is a block diagram of a repeater according to an embodiment of this disclosure.

FIG. 2 is a block diagram of an exemplary repeater 14 according to this disclosure. In FIG. 2, the illustrated components include specific components that are used in accordance with the teaching of this disclosure. However, other components may also exist, e.g., in order to control other repeater functions. In general, repeater 14 includes repeating circuitry 23 to receive a signal sent from a first device in wireless communication system 6 and repeat the signal to a second device in wireless communication system 6. More specifically, in this example, repeater 14 includes a first antenna 22 to receive signals from base station 12C, signal repeating circuitry 23 to condition the received signals, and a second antenna 26 to transmit, i.e., to repeat, the signals received by first antenna 22.

By way of example, signal repeating circuitry 23 may include a first amplifier 24 to amplify the signals received at first antenna 22. Also, signal conditioning circuitry 23 may include a second amplifier 28 to amplify signals received at second antenna, e.g., from subscriber unit 16. In that case, first antenna 22 transmits, i.e., repeats, the signals received at second antenna 26. In other embodiments, one of antennas 22, 26 may be replaced with an interface to a physical transmission line, such as a fiber optic cable, a copper wire, or the like.

In accordance with this disclosure, repeater 14 further includes a positioning unit 25. For example, positioning unit 25 may comprise a positioning receiver, such as a GPS receiver. Positioning unit 25 may be implemented with analog or digital components. In general, positioning unit 25 receives positioning signals 7 from positioning satellites 5 and calculates the position of repeater 14 on or near the earth's surface. One or more terrestrial signals may also be used as positioning signals.

In some cases, positioning unit 25 may be coupled to a dedicated GPS antenna 27 tuned to receive positioning signals from positioning satellites, or alternatively, positioning unit 25 may receive the positioning signals from one or both of antennas 22, 26. If implemented with digital components, positioning unit 25 may comprise a digital signal processor (DSP) executing software modules, a programmable microprocessor, or discrete hardware components. In that case, a digital-to-analog converter (not shown) would also be used to convert received signals to digital values that can be processed in digital.

In other embodiments, positioning unit 25 may be implemented in any combination of hardware, software, firmware, one or more programmable microprocessors, digital signal processors, or the like. In one example, positioning unit 25 comprises a DSP or chip-set similar to those typically implemented in subscriber units that include GPS functionality. Importantly, positioning unit 25 allows repeater 14 to receive and measure signals 7 from satellites 5 of satellite positioning system 4 (FIG. 1). Accordingly, positioning unit 25 allows repeater 14 to triangulate its position on or near the earth's surface.

Upon calculating its position, repeater 14 can send information indicative of its location to other devices in wireless communication system 6 in order to improve network performance. For example, repeater 14 may send information indicative of its calculated location to base station 12C, which forwards the information to PDE 16. In that case, PDE 16 or base station 12C may use the information indicative of the location of repeater 14 to calculate a repeater delay, as described in greater detail below. In addition, PDE 16 may use the information indicative of the location of repeater 14 to improve the quality of position assistance information generated for subscriber unit 10.

Figure 3:
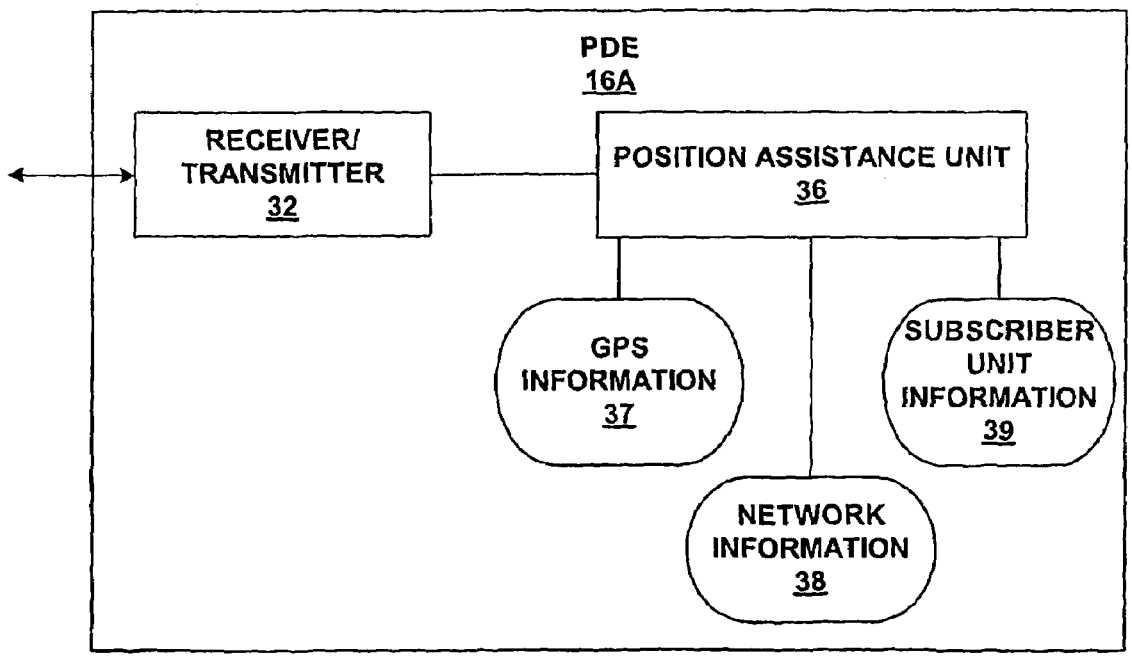
FIG. 3 is a block diagram of a position determination entity (PDE) according to an embodiment of this disclosure.

FIG. 3 is a block diagram of a position determination entity (PDE) 16A according to one embodiment of this disclosure, which may correspond to PDE 16 (FIG. 1). In FIG. 3, the illustrated components of PDE 16A are specifically those components used in receiving information from subscriber unit 10 and repeater 14 and generating position assistance information for subscriber unit 10 according to embodiments of this disclosure. Other components may exist in PDE for other functions. For simplicity, however, the additional components are not illustrated.

PDE 16A uses positioning information received from repeater 14 to generate position assistance information for subscriber unit 10 in accordance with this disclosure. As illustrated in FIG. 3, PDE includes a transmitter/receiver 32, a position assistance unit 36 and one or more databases or memory that store GPS information 37, network information 38 and subscriber unit information 30. Transmitter/receiver 32, receives information from subscriber unit 10, e.g., via base station 12C. For example, the information sent from subscriber unit 10 to PDE 16A through base station 12C includes information indicative of various base station signals 15 detected by subscriber unit 10.

In particular, subscriber unit 10 may identify base stations 12 by detecting phase offsets in signals 15, e.g., pseudo-random noise (PN) offsets from system time. Subscriber unit 10 sends information to PDE 16A indicative of the detected signals 15, which identify base stations 12. Once transmitter/receiver 32, receives information from subscriber unit 10, position assistance unit 36 stores the information as subscriber unit information 39 and subsequently accesses the subscriber unit information 39 in order to generate position assistance information.

PDE 16A also stores GPS information 37, which can be accessed by position assistance unit 36 when generating position assistance information. GPS information 37 refers to information indicative of the location of the various satellites 5 of satellite positioning system 4 or similar terrestrial positioning signal sources. GPS information 37 may be measured by PDE 16A, e.g., by receiving signals 7, or can be stored and updated, e.g., by some external source.

PDE 16A also stores network information 38, which generally includes an almanac of base stations in proximity to subscriber unit 10, and may be received from subscriber unit 10 or maintained within PDE 16A as a general mapping of the topology of wireless communication network 6.

In accordance with this disclosure, transmitter/receiver 32 of PDE 16A receives positioning information from repeater 14, e.g., via base station 12C. Position assistance unit 36 uses or stores the positioning information received from repeater 14 in order to update network information 38 to reflect the presence and location of repeater 14 in wireless communication system 6. Accordingly, network information 38 identifies the presence of repeater 14, and also includes an indication of the calculated location of repeater 14. PDE 16A uses network information 38, including information indicative of the location of repeater 14, to improve the quality of position assistance information generated for subscriber unit 10.

In order to generate the position assistance information, position assistance unit 36 accesses GPS information 37, network information 38 and subscriber unit information 39. Position assistance unit 36 processes network information 38 and subscriber unit information 39 in order to identify an approximate location of subscriber unit 10 in wireless communication network 6. Position assistance unit 36 then generates position assistance information based on the approximate location of subscriber unit 10 and GPS information 37. For example, position assistance unit 36 uses GPS information 37 to identify a set of positioning satellites 5 that are within view to subscriber unit 10 based on the probable location of subscriber unit 10. Then, receiver/transmitter 32 can forward this generated position assistance information, e.g., a list of positioning satellites, to subscriber unit 10 in order to accelerate a triangulation process performed by subscriber unit 10 to identify its location.

By receiving positioning information from repeater 14, the position assistance information generated by PDE 16A for subscriber unit 10 can be improved. For example, if subscriber unit 10 reports detection of signals associated with base station 12C, PDE 16A may nevertheless determine that subscriber unit 10 is not in close proximity to base station 12C, but rather in proximity to repeater 14. The positioning information sent from repeater 14 to PDE 16A facilitates such a determination. In this manner, the position information determined and sent from repeater 14 to PDB 16A can improve the quality and accuracy of position assistance information generated by PDE 16A for subscriber unit 10.

Position assistance unit 36 may comprise a digital signal processor (DSP) executing software modules, a programmable microprocessor, or discrete hardware components. Also, position assistance unit 36 may be implemented in any combination of hardware, software, firmware, one or more programmable microprocessors, digital signal processors, or the like. If the techniques are implemented by PDE 16A in software, a memory or other computer-readable medium (not shown) may be coupled to position assistance unit 36 in order to store the software instructions loaded into position assistance unit 36 for execution within PDE 16A.

Figure 4:
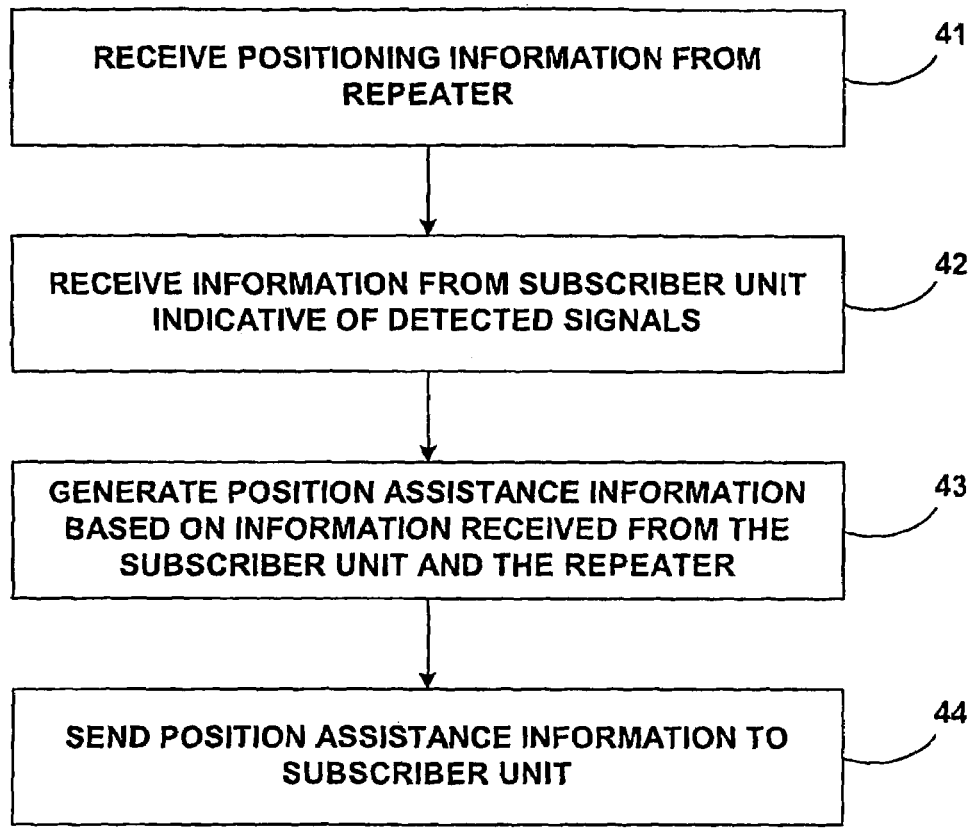
FIG. 4 is a flow diagram illustrating a technique according to an embodiment of this disclosure.

FIG. 4 is a flow diagram illustrating a technique according to an embodiment of this disclosure. As shown in FIG. 4, PDE 16A receives positioning information from repeater 14 (41). For example, the positioning information can be sent from repeater 14 to PDE 16A through base station 12C. In addition, PDE 16A receives information from subscriber unit 10 indicative of detected base station signals 15 (42). For example, subscriber unit 10 can identify identification (ID) codes from signals 15, or may identify PN offsets of signals 15 relative to system time. In particular, if system 6 is a CDMA system the presence of pilot symbols at a defined PN offset relative to system time can be detected in signals 15 to identify base stations 12.

PDE 16A generates position assistance information based on information received from subscriber unit 10 and the positioning information received from repeater 14 (43). For example, PDE 16A may use positioning information received from repeater 14 to update network information 38 and thereby maintain a more accurate record of the topology of wireless communication system 6. In this manner, the position information determined and sent from repeater 14 to PDE 16A can improve the quality and accuracy of position assistance information generated by PDE 16A for subscriber unit 10. Once generated, PDE 16A sends the position assistance information to subscriber unit 10 (44), e.g., through base station 12C. Subscriber unit 10 uses the position assistance information to accelerate the process of identifying its location using signals 7 from positioning satellites 5.

Figure 5:
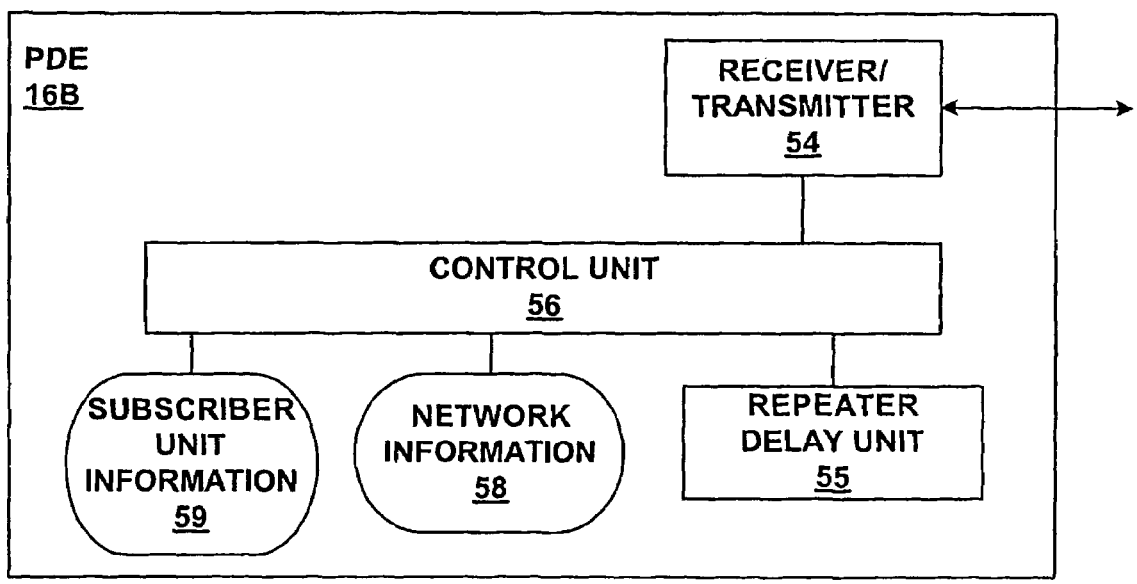
FIG. 5 is another block diagram of a PDE according to another embodiment of this disclosure.

FIG. 5 is another block diagram of an exemplary PDE 16B, which may correspond to PDE 16 (FIG. 1). In FIG. 5, the illustrated components of PDE 16B are specifically those components used in receiving positioning information from repeater 14, subscriber unit 10 and base station 12C, and calculating a repeater delay in accordance with this disclosure. Numerous other components also exist in PDE 16B for other functions, such as signal encoding and demodulation. For simplicity, however, the additional components are not illustrated. In the description that follows, PDE 16B will be used to describe the process of calculating a repeater delay. Numerous other devices in the network, however, could alternatively be used to perform such calculations. For example, base station 12C could include the components illustrated in FIG. 5 to perform the process of calculating the repeater delay. In general, any network device can be used for this purpose.

As illustrated in FIG. 5, PDE 16B includes a receiver/transmitter 54, a control unit 56, and a database or memory that stores network information 58 and subscriber unit information 59. PDE 16B also includes a repeater delay unit 55 to calculate a repeater delay associated with signals sent from the subscriber unit 10 to base station 12C through repeater 14.

In order to calculate a repeater delay, receiver/transmitter 54 of PDE 16B receives positioning information associated with devices in wireless communication system 6. In particular, PDE 16B receives positioning information associated with repeater 14, subscriber unit 10 and base station 12C. For example, base station 12C may also include a positioning receiver (not shown) to triangulate its position using signals 7 from positioning satellites. Alternatively, base station 12C may be programmed to know its location, or may receive its location from an external device. Base station 12C sends the positioning information associated with repeater 14, subscriber unit 10 and base station 12C to PDE 16B, which stores the information in a database or memory as network information 58.

PDE 16B also receives information indicative of observed signals sent from base station 12C to subscriber unit 10. PDE 16B stores the information indicative of observed signals sent from base station 12C to subscriber unit 10 as subscriber unit information 59. For example, subscriber unit 10 can send information to base station 12C indicative of the detected signals 15C', which identify base station 12C. In particular, an observed offset from system time associated with signals 15C' can be communicated from subscriber unit 10 to base station 12C. The observed offset can then be communicated from base station 12C to PDE 16B, and stored as subscriber unit information 59.

Control unit 56 accesses network information 58 and forwards the positioning information associated with repeater 14, subscriber unit 10 and base station 12C to repeater delay unit 55. Control unit 56 similarly accesses subscriber unit information 59 and forwards subscriber unit information 59 to repeater delay unit 55. Repeater delay unit 55 calculates a repeater delay for signals sent from subscriber unit 10 to base station 12C through repeater 14 based on the positioning information associated with repeater 14, subscriber unit 10, and base station 12C, and the subscriber unit information 59 indicative of observed signals sent from base station 12C to subscriber unit 10.

For example, given the position of subscriber unit 10, base station 12C, and repeater 14, repeater delay unit 55 identifies a predicted delay based on distances between subscriber unit 10 and repeater 14, and between repeater 14 and base station 12C. Repeater delay unit 55 also identifies an observed delay, i.e., the actual time it takes a signal to travel from subscriber unit 10 to base station 12C through repeater 14. In particular, the observed delay can be identified from the subscriber unit information 59 indicative of the detected signals 15C', which is sent from subscriber unit 10 to base station 12C. Repeater delay unit 55 then calculates the repeater delay as a difference between the observed delay and the predicted delay. Once the repeater delay has been calculated, it can be communicated to one or more other devices in wireless communication system 6 so that such devices can be aware of the delay and possibly compensate for the repeater delay.

In one embodiment, repeater delay unit 55 identifies the observed delay by identifying a phase offset of pilot symbols relative to system time associated with wireless communication system 6. In other words, pilot symbols of signals 15C' detected by subscriber unit 10 will be delayed relative to the defined PN offset associated with base station 12C because of propagation and repeater delays. When PDE 16B receives subscriber unit information 59 indicative of detected signals 15C', repeater delay unit 55 can measure the observed delay of signals 15C' based on observed phase offset of pilot symbols relative to system time. Then, using the predicted delay and observed delay, repeater delay unit 55 can attribute the difference between the observed delay and the predicted delay to processing that occurs within repeater 14.

In some embodiments, repeater delay unit 55 can be integrated as part of control unit 56. Repeater delay unit 55 and control unit 56 may comprise one or more digital signal processors (DSPs) executing software modules, one or more programmable microprocessors, or discrete hardware components. Also, repeater delay unit 55 and control unit 56 may be implemented in any combination of hardware, software, firmware, one or more programmable microprocessors, digital signal processors, or the like. If techniques are implemented by PDE 16B in software, a memory or other computer-readable medium (not shown) may be coupled to control unit 56 in order to store the software instructions executed by repeater delay unit 55.

Figure 6:
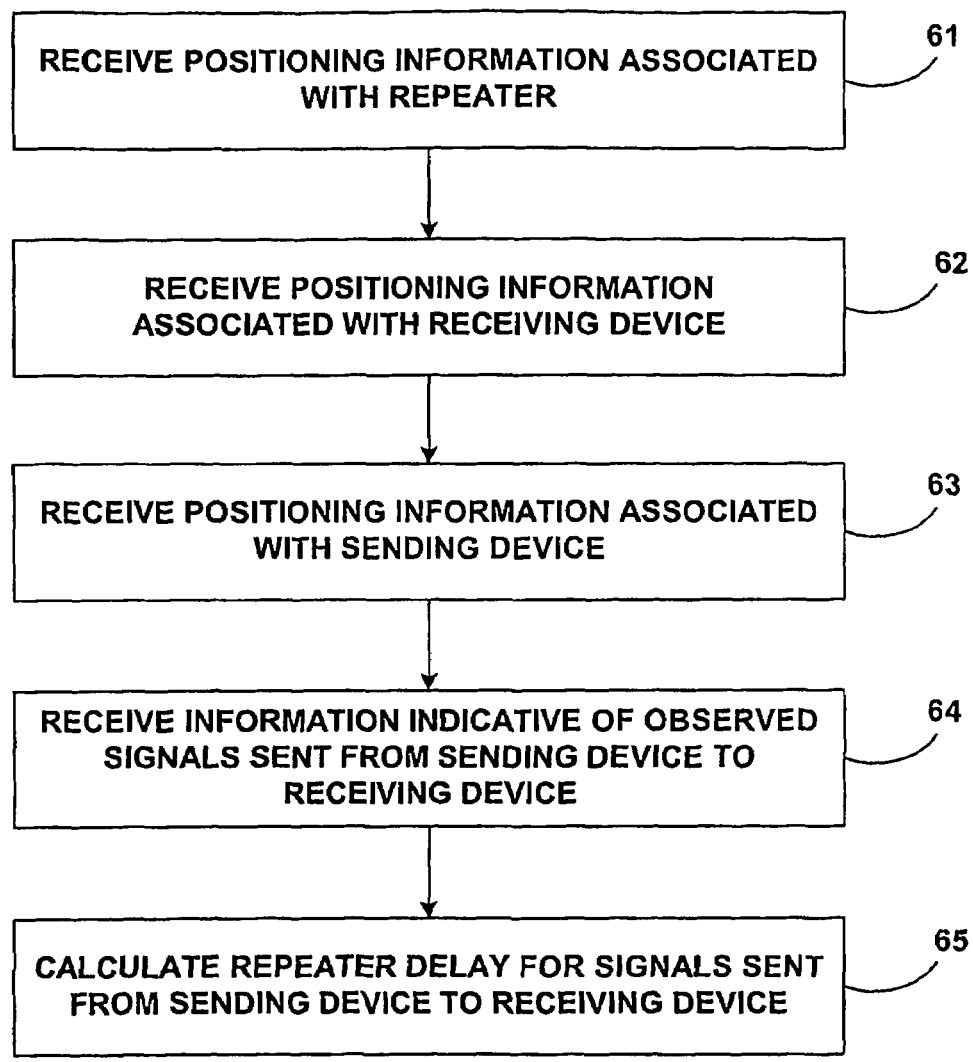
FIG. 6 is another flow diagram illustrating a technique according to an embodiment of this disclosure.

FIG. 6 is a flow diagram illustrating a technique for calculating a repeater delay according to an embodiment of this disclosure. FIG. 6 generally refers to a sending device, a receiving device and a repeater. Signals can be sent from the sending device to the receiving device through the repeater. By way of example, the sending device may comprise base station 12A and the receiving device may comprise subscriber unit 10. However, these roles may be reversed in other embodiments, and the techniques may also be applied with other devices that communicate through a repeater.

As shown in FIG. 6, a network device receives positioning information associated with a repeater (61) and also receives positioning information associated with a receiving device (62). In addition, the network device receives positioning information associated with a sending device (63). In some cases, the sending device may be used to calculate the repeater delay, in which case the sending device may receive its positioning information from its own internal components. In other words, the network device used to calculate the repeater delay may be the sending device, e.g., a base station used to calculate a repeater delay.

In any case, the network device receives information indicative of observed signals sent from the sending device to the receiving device (64). In particular, the information indicative of observed signals identifies an observed delay from the sending device to the receiving device, e.g., as a phase offset skewed from an expected PN offset relative to system time. Using this collection of information, the sending device calculates a repeater delay associated with signals sent from the sending device to the receiving device (65).

In other words, in steps 61-63, the network device obtains information indicative of the locations of the sending device, the receiving device and the repeater. This information establishes the relative distances between the respective devices and therefore, allows for calculation of a predicted delay. In step 64, the network device obtains information indicative of the actual delay of signals sent from the sending device to the receiving device. Then, using the predicted delay and observed delay, the network device can attribute the difference between the observed delay and the predicted delay to processing that occurs within the repeater. In this manner, the network device calculates the repeater delay (65).

A number of embodiments have been described. In particular, a repeater of a wireless communication system has been described that includes a positioning unit, such as a GPS receiver, so that the repeater can calculate its location. In addition, various techniques have been described that exploit the positioning information generated by the repeater in order to improve the wireless communication system. The techniques described herein may be implemented in various devices of wireless communication system 6 in hardware, software, firmware, or the like. Example hardware implementations include implementations within a digital signal processor (DSP), an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer-readable medium may store or otherwise comprise computer-readable instructions, i.e., program code, that can be executed by a processor or DSP of a repeater, PDE or base station to carry out one of more of the techniques described above.

For example, the computer-readable medium may comprise random access memory (R), read-only memory (ROM), non-volatile random access memory (NVRAM), electrically erasable programmable read-only memory (EEPROM), flash memory, or the like. The computer-readable medium can be coupled to positioning unit 25 of repeater 15, control unit 56 of PDE 16B, or position assistance unit 36 of PDE 16A. In those cases, positioning unit 25, control unit 56 or position assistance unit 36 may comprise a processor or DSP that executes various software modules stored in the computer-readable medium.

Numerous other modifications may be made without departing from the spirit and scope of this disclosure. For example, although many of the techniques have been described in the context of CDMA systems, the techniques may also be applicable to other systems such as time division multiple access (TDMA) systems, frequency division multiple access (FDMA) systems, systems that make use of orthogonal frequency division multiplexing (OFDM), systems such as the global system for mobile communication (GSM) that use combinations of TDMA and FDMA techniques, or the like.

Also, various techniques have been described for exploiting the positioning information associated with the repeater in order to improve the wireless communication system. In that case, the positioning information associated with the repeater may be generated by the repeater, as described herein, or alternatively, may be determined by another device, e.g., at the time the repeater is deployed. The positioning information associated with the repeater may be used to help calculate a repeater delay. Also, the positioning information associated with the repeater may be used to improve the quality of position assistance information generated and sent to subscriber units of the wireless communication system. Although the repeater may generate its positioning information, some embodiments are not necessarily limited in that respect.

Il addition, although many aspects of this disclosure have been described in the context of GPS satellites and a GPS receiver, in other embodiments, the repeater may calculate its position based on other signals such as terrestrial signals or signals from other satellite positioning systems. These and other embodiments are within the scope of the following claims.

The invention claimed is:

1. A method comprising:
  receiving positioning information from a repeater of a wireless communication system indicative of a location of the repeater, the positioning information being based, at least in part, on positioning signals received by the repeater; and
  generating position assistance information for a subscriber unit in communication with the repeater based, at least in part, on the location of the repeater.

2. The method of claim 1, further comprising:
  receiving information indicative of signals detected by the subscriber unit of the wireless communication system; and
  generating the position assistance information further based, at least in part, on the information indicative of signals detected by the subscriber unit.

3. The method of claim 2, further comprising sending the position assistance information to the subscriber unit.

4. The method of claim 2, wherein the position assistance information identifies a set of positioning system satellites that are in view to the subscriber unit.

5. The method of claim 2, wherein the information indicative of signals detected by the subscriber unit comprises phase offsets, and the signals detected by the subscriber unit are associated with base stations of the wireless communication system.

6. The method of claim 1, further comprising:
  receiving positioning information for a receiving device;
  receiving positioning information for a sending device;
  receiving observed information indicative of signals sent from the sending device to the receiving device; and
  calculating a repeater delay for signals sent from the sending device to the receiving device through the repeater based, at least in part, on the positioning information for the repeater, the positioning information for the receiving device, the positioning information for the sending device, and the observed information.

7. The method of claim 6, wherein calculating the repeater delay comprises:
  identifying a predicted delay based, at least in part, on distances between the sending device and the repeater and the repeater and the receiving device;
  identifying an observed delay from the observed information; and
  calculating the repeater delay as a difference between the observed delay and the predicted delay.

8. The method of claim 7, wherein identifying the observed delay comprises identifying from the observed information a phase offset of pilot symbols relative to system time associated with the wireless communication system.

9. An apparatus for use in a wireless communication system, the apparatus comprising:
  a receiver to receive positioning information from a repeater of a wireless communication system indicative of a location of the repeater, the positioning information being based, at least in part, on positioning signals received by the repeater; and
  a position assistance unit to generate position assistance information for a subscriber unit in communication with the repeater based, at least in part, on the location of the repeater.

10. The apparatus of claim 9, further comprising a transmitter to send the position assistance information to the subscriber unit.

11. The apparatus of claim 9, wherein the position assistance information identifies a set of positioning system satellites that are in view to the subscriber unit.

12. The apparatus of claim 9, the receiver to receive information indicative of signals detected by the subscriber, wherein the signals detected by the subscriber unit are associated with base stations of the wireless communication system, and the position assistance unit to generate the position assistance information further based, at least in part, on the information indicative of the signals detected by the subscriber.

13. An article comprising:
  a non-transitory computer-readable medium having stored thereon instructions executable by a control unit in a device of a wireless communication system to:
    access positioning information received from a repeater indicative of a location of the repeater, the positioning information being based, at least in part, on positioning signals received by the repeater;
    access information received via the repeater indicative of signals detected by a subscriber unit in communication with the repeater; and
    generate position assistance information for the subscriber unit based, at least in part, on the location of the repeater and the information indicative of signals detected by the subscriber unit.

14. The article of claim 13, further comprising instructions executable by the control unit to send the position assistance information to the subscriber unit.

15. The article of claim 13, wherein the position assistance information identifies a set of positioning system satellites that are in view to the subscriber unit.

16. The article of claim 13, wherein the information indicative of signals detected by the subscriber unit comprises phase offsets, wherein the signals are associated with base stations of the wireless communication system.

17. An apparatus comprising:
  means for receiving positioning information from a repeater of a wireless communication system indicative of a location of the repeater, the positioning information being based, at least in part, on positioning signals received by the repeater; and
  means for generating position assistance information for a subscriber unit in communication with the repeater based, at least in part, on the location of the repeater.

18. The apparatus of claim 17, further comprising:
  means for receiving information indicative of signals detected by the subscriber unit of the wireless communication system; and
  means for generating the position assistance information further based, at least in part, on the information indicative of signals detected by the subscriber unit.

19. The apparatus of claim 18, further comprising:
means for sending the position assistance information to the subscriber unit.

20. The apparatus of claim 18, wherein the position assistance information identifies a set of positioning system satellites that are in view to the subscriber unit.

21. The apparatus of claim 18, wherein the information indicative of signals detected by the subscriber unit comprises phase offsets, and the signals detected by the subscriber unit are associated with base stations of the wireless communication system.

22. The apparatus of claim 17, further comprising:
means for receiving positioning information for a receiving device;
means for receiving positioning information for a sending device;
means for receiving observed information indicative of signals sent from the sending device to the receiving device; and
means for calculating a repeater delay for signals sent from the sending device to the receiving device through the repeater based, at least in part, on the positioning information for the repeater, the positioning information for the receiving device, the positioning information for the sending device, and the observed information.

23. The apparatus of claim 22, wherein the means for calculating the repeater delay comprises:
means for identifying a predicted delay based, at least in part, on distances between the sending device and the repeater and the repeater and the receiving device;
means for identifying an observed delay from the observed information; and
means for calculating the repeater delay as a difference between the observed delay and the predicted delay.

24. The apparatus of claim 23, wherein the means for identifying the observed delay comprises:
means for identifying from the observed information a phase offset of pilot symbols relative to system time associated with the wireless communication system.

25. The apparatus of claim 17, wherein the means for receiving the positioning information receives the positioning information over a wired connection to a packet-based network.

26. The method of claim 1, wherein the positioning information is received over a wired connection to a packet-based network.

27. The apparatus of claim 9, wherein the positioning information is received over a wired connection to a packet-based network.

28. The article of claim 13, wherein the positioning information is received over a wired connection to a packet-based network.

* * * * *